Patented Mar. 26, 1946

2,397,143

UNITED STATES PATENT OFFICE 2,397,143

BARIUM BROMATE IMPRESSION MATERIAL

Homer van Beuren Joy, Montclair, N. J., assignor to Montclair Research Corporation, a corporation of New Jersey No Drawing. Application October 6, 1943, Serial No. 505,217

12 Claims. (Cl. 18—47)

This invention relates generally to impression taking materials containing water-soluble alginates and particularly to dental impression materials.

The object of this invention is to provide an impression material which, when mixed with water and applied to a structure, the reproduction of which is desired, sets in a controllably short time to yield a stiff elastic gel. Another object is to obtain a material which can be used to take an impression of parts of the human mouth without discomfort to the patient.

Commercial calcium sulfate alginate impression materials ordinarily employ a phosphate to control the setting time. This is undesirable because when a plaster cast of the impression is made the phosphate retards the set of the plaster. Also, phosphates, since they easily absorb or lose water, may bring about a premature reaction, and in many cases have caused poor shelf life. It is a further object of this invention to provide a material which can be used with a catalyst which is stable with respect to its water content and which not only does not retard the set of plaster but actually accelerates it.

It is desirable that a material which is to be used for taking impressions should be easily brought into condition for use; it should require no heat; it should be of such physical condition that it can be inserted into cavities and fissures and readily removed therefrom without destruction when set; it should set in a suitable time which is not so short as to prevent proper manipulation in application nor so long as to cause discomfort to a dental patient; it should form a sharp, accurate impression of the part to which it is applied; it should set to a tough rubbery state so that it can be stripped from the structure to which it has been applied even when undercuts are present, and the dry powder composition should be stable over a long period before mixing with water for use.

I have found that impression materials which meet the above requirements can be made from water-soluble alginates and barium bromate. A filler is preferably added and also, where desired, a retardive agent. These materials may be used for taking impressions of the human mouth or other parts of the human body, artistic or mechanical objects and the like. Some of my formulations have exceptional strength.

As retardive agents there may be used any soluble compound capable of forming a substantially insoluble salt of barium such as a phosphate, a carbonate, a sulfate or the like. I prefer to use a sulfate, especially potassium sulfate, since it gives substantially perfect plasters in a short time. The phosphate agent which is ordinarily used with calcium sulfate alginate materials not only retards the set of plaster but may actually chalk the surface.

As fillers any substantially water-soluble powder can be used, such as calcium or magnesium carbonate, mica, clay, hard waxes and the like. The amount of filler to be used with a given quantity of water depends on the apparent density, water absorptive properties, and the amounts of the other ingredients in the formula. With a high alginate content I usually prefer to use a smaller amount of filler.

The proportions used in the formulae are subject to considerable variation depending upon the type of material desired. For instance, a high filler-low alginate composition would have less elasticity than a high alginate-low filler material. Increasing the amount of water would tend to slow the set and to give a softer material. A very slow-acting barium bromate, especially a highly dehydrated, slow-dissolving type, might be used without any retardive agent, although I prefer not to omit the agent, since potassium or certain other sulfates improve the plasters.

The following are illustrative examples of impression materials and are not to be construed as limiting since the proportions can be changed to a certain extent to meet individual requirements. Parts are by weight. The ingredients of the powders are finely divided and intimately mixed and are used with 50 parts of water in each case.

Example 1

| | |
|---|---|
| Barium bromate | 2.4 |
| Potassium alginate | 1.7 |
| Precipitated chalk | 16 |
| Potassium sulfate | 0.5 |

This material was spatulated with water for about 1 minute and set in the mouth in 3 minutes. An accurate impression of the teeth was obtained and an excellent plaster cast was made with an unusually short setting time.

Example 2

| | |
|---|---|
| Barium bromate | 2.0 |
| Precipitated chalk | 14.0 |
| Zinc oxide | 4 |
| Potassium sulfate | 0.4 |
| Sodium alginate | 1.5 |

Example 3

| | |
|---|---|
| Barium bromate | 2.4 |
| Trisodium phosphate | 0.6 |
| Sodium alginate | 1.5 |
| Magnesium carbonate | 12.0 |

I claim:

1. An impression material comprising a water-soluble alginate, a filler and barium bromate.
2. An impression material comprising a water-soluble alginate, a filler, a retarding agent and barium bromate.

3. An impression material comprising sodium alginate, a filler, a retarding agent and barium bromate.

4. An impression material comprising sodium alginate, a filler, potassium sulfate and barium bromate.

5. An impression material comprising potassium alginate, a filler, a retarding agent and barium bromate.

6. An impression material comprising potassium alginate, a filler, potassium sulfate and barium bromate.

7. An impression material comprising from 6.8 to 9.0% of water-soluble alginate, from 9.1 to 14.5% of barium bromate, from 1.8 to 3.6% of retarding agent, and from 72.7 to 82.1% of filler.

8. An impression material comprising 2.4 parts of barium bromate, 1.7 parts of potassium alginate, 16 parts of precipitated chalk, and 0.5 part of potassium sulfate, the parts being by weight.

9. An impression material comprising 2.0 parts of barium bromate, 14.0 parts of precipitated chalk, 4 parts of zinc oxide, 0.4 part of potassium sulfate, and 1.5 parts of sodium alginate, the parts being by weight.

10. An impression material comprising 2.4 parts of barium bromate, 0.6 part of trisodium phosphate, 1.5 parts of sodium alginate, and 12.0 parts of magnesium carbonate, the parts being by weight.

11. An impression material comprising a water-soluble alginate, a filler, a soluble phosphate as a retarding agent, and barium bromate.

12. An impression material comprising a water-soluble alginate, a filler, a soluble sulfate as a retarding agent, and barium bromate.

HOMER van BEUREN JOY.